United States Patent [19]
Ishikawa

[11] Patent Number: 5,921,651
[45] Date of Patent: Jul. 13, 1999

[54] SURFACE LIGHT SOURCE DEVICE OF SIDE LIGHT TYPE HAVING DIFFUSING ELEMENT WITH IMPROVED DISTRIBUTION PATTERN OF LIGHT

[75] Inventor: Tsuyoshi Ishikawa, Tokyo, Japan

[73] Assignee: Enplas Corporation, Kawaguchi, Japan

[21] Appl. No.: 08/624,313

[22] Filed: Mar. 27, 1996

[30] Foreign Application Priority Data

Mar. 31, 1995 [JP] Japan .................................. 7-097450

[51] Int. Cl.⁶ ...................................................... F21V 8/00
[52] U.S. Cl. ................................................ 362/31; 362/26
[58] Field of Search .................................. 362/31, 26, 27

[56] References Cited

U.S. PATENT DOCUMENTS

| | | | |
|---|---|---|---|
| 4,937,709 | 6/1990 | Yanagi et al. | 362/31 |
| 4,985,809 | 1/1991 | Matsui et al. | 362/31 |
| 5,093,765 | 3/1992 | Kashima et al. | 362/31 |
| 5,134,549 | 7/1992 | Yokoyama | 362/31 |
| 5,178,447 | 1/1993 | Murase et al. | 362/31 |
| 5,283,673 | 2/1994 | Murase et al. | 362/31 |
| 5,357,405 | 10/1994 | Park | 362/31 |
| 5,386,347 | 1/1995 | Matsumoto | 362/31 |
| 5,408,387 | 4/1995 | Murase et al. | 362/31 |
| 5,408,388 | 4/1995 | Kobayashi et al. | 362/31 |
| 5,641,219 | 6/1997 | Mizobe | 362/31 |
| 5,649,754 | 7/1997 | Matsumoto | 362/31 |
| 5,667,289 | 9/1997 | Akahane et al. | 362/31 |

FOREIGN PATENT DOCUMENTS

| | | | |
|---|---|---|---|
| 4-62519 | 2/1992 | Japan . | |
| 4-268506 | 9/1992 | Japan . | |
| 40616062 | 6/1994 | Japan | 362/31 |

*Primary Examiner*—Laura Tso
*Attorney, Agent, or Firm*—Staas & Halsey

[57] ABSTRACT

A dot pattern of a light guide plate is optimally designed for a surface light source device of side light type. A lamp 1 is disposed at the side of the light guide plate 2 and light introduced from a light incidence surface into the light guide plate 2 is emitted from a luminous surface. The dot pattern is arranged on the rear surface of the light guide plate 2 according to the following principles: (1) there is a (gradient) portion where the rate of area occupation of the dot pattern increases from a region (usually a far region) lowly exposable to light from the lamp 1; and (2) there is no sharp variation in the rate of area occupation of the dot pattern. At a corner of the light guide plate 2, a substantially triangular dot pattern is disposed for compensating any luminance drop due to the location in the vicinity of an electrode portion 1a of the lamp 1.

3 Claims, 9 Drawing Sheets

SURFACE LIGHT SOURCE DEVICE OF SIDE LIGHT TYPE HAVING DIFFUSING ELEMENT WITH IMPROVED DISTRIBUTION PATTERN OF LIGHT

BACKGROUND

1. Field of the Invention

The present invention relates to a surface light source device of a type in which a primary light source is disposed at the side of a light guide plate and one surface of the light guide plate serves as a luminous surface, i.e., a "surface light source device of side light type", and more particularly to a side-light-type surface light source device for improving a distribution pattern of a light diffusing element on a rear surface of the light guide plate. The side-light-type surface light source device according to the present invention is particularly useful when applied to back lighting of a liquid crystal display.

2. Related Art

A general structure of a surface light source device of a side light type and its operation will be described. FIG. 1 is a fragmentary cross-sectional view showing the structure of a known surface light source device of side light type. In FIG. 1, a reference numeral 2 designates a light guide plate usually made of transparent plastic material. At the side of the light guide plate 2, a rod-shaped light source element 1 is disposed along a side edge surface (an incidence surface) 2a of the light guide plate 2, as a primary light source. Generally, a cold-cathode tube is used as the light source element 1. The light source element 1 is hereinafter simply referred to as a lamp.

One surface of the light guide plate 2 serves as a luminous surface on which at least one sheet-shaped element 3 (hereinafter referred to as "an additional element") is additionally disposed. The additional element 3 is provided in the form of a light diffusing sheet, a prism sheet, a prism sheet protection sheet or an interference fringe prevention sheet, etc.

On a surface opposite to the luminous surface (hereafter referred to as "a rear surface" and also referred to as a reflecting surface), a reflecting sheet 4 is disposed. The reflecting sheet 4 is provided in the form of a silver foil, an aluminum foil or a white sheet. At the back surface of the lamp 1, a non-illustrated reflector is disposed for improving the efficiency of incidence of light on the light guide plate 2.

A major part of the light emitted from the lamp 1 is introduced into the light guide plate 2 directly or indirectly from the incidence surface 2a. The light introduced into the light guide plate 2 is guided toward the back surface opposite to the incidence surface 2a as repeatedly reflected on the front and rear surfaces of the light guide plate 2. The light is gradually taken out from the luminance surface at this stage and emitted as illuminating light as being subjected to an action (a light diffusing action) of the additional element 3. This illuminating light is utilized as, for example, a back lighting of a liquid crystal display.

The foregoing are the most basic structure and operation of the surface light source device of a side light type. With the simple structure and operation as described above, it is difficult to secure evenness of luminance of the upper surface of the additional element 3, which is served as a luminous surface. Specifically, a gradient of the luminance is caused on the luminous surface according the distance from the incidence surface 2a. Further, the function of directing the light introduced into the light guide plate 2 to the luminous surface is inadequate, so that the luminance level tends to be deficient. In order to avoid this problem, it has been adopted to arrange a number of light-diffusive elements in a predetermined distribution pattern on the rear surface of the light guide plate 2. As a number of dot-shaped elements are arranged according to a predetermined concept, the distribution pattern is called a dot pattern.

FIG. 2 is a plan view, as seen from the rear side, of the light guide plate 2 on which the light diffusing elements are arranged in a most basic distribution pattern. In FIG. 2, large and small circles show light diffusing elements in the form of a print layer of light-diffusive ink, an aventurine surface (a finely roughed surface), etc. A number of light diffusing elements are arranged in rows parallel to the lamp 1. A density of existence of light diffusing elements (a rate of area occupation of light-diffusive region) decreases gradually according to the distance from the lamp 1.

Adopting the light guide plate 2 as shown in FIG. 2, it is possible to suppress the luminance difference depending on the distance from the lamp 1. However, the luminance of a portion (indicated by S) near the electrode portion 1a of both ends of the lamp 1 would be insufficient. For example, in the case of a lamp of 217 mm in full length, which is available on the market, the length of an emitting portion is 203 mm and there is an electrode portion (a non-emitting portion) of 7 mm wide at each end of the lamp. In the vicinity of such a non-emitting portion, the luminance would be insufficient as a matter of course.

If the length of the emitting portion of the lamp 1 is set substantially equal to the width d of the light guide plate 2, it is possible to somehow minimize the foregoing problem and, on the other hand, adopting a lamp having the emitting portion of such length is very unpreferable in view of making both shape and size of the surface light source device compact.

Various proposals have been made to overcome the above problems. FIG. 3 illustrates one of the proposals. In this conventional art, two corner portions F of the rear surface of the light guide plate 2 shown in FIG. 2, which are nearer to the electrode portion 1a of the lamp 1 are treated differently from the other corner portions with respect to width t1 and depth t2. Namely, in these corner portions F, the light diffusing elements are arranged in an increased density as compared with the circumference thereof. Within the corner portions F, as shown, density of the light diffusing elements may also be graded in the depthwise direction, if necessary.

However, this method of defining the distribution pattern also involves a problem. Namely, since the corner portions F are treated specially, it is inevitable that a sharp difference occurs in density of occupation of light diffusing elements between portions contiguous to these corners F. This difference may cause unevenness of luminance in the vicinity of the corner portions.

FIG. 4 illustrates another conventional art according to a different concept from the example shown in FIG. 3. In this conventional art, the rear surface of the light guide plate 2 shown. in FIG. 2 is divided into a region I near the lamp 1 and a region II far from the lamp 1. In the region I, the light diffusing elements are arranged in such a manner that they radially rodite about a point G which confronts a central point of the lamp 1. Namely, within the region I, the distribution pattern is defined so that the density of occupation of light diffusing elements is minimal in the vicinity of the point G, and gradually increases in accordance with the distance from the point G.

Meanwhile, within the region II, a concept similar to that in FIG. 2 is adopted. Namely, the light diffusing elements are arranged in rows parallel to the lamp 1, and its density of occupation decreases gradually according to the distance from the lamp 1.

This method of defining the distribution pattern has another problem. Namely, since the density of occupation of light diffusing elements is graded radially in the region I while it is graded linearly in the depthwise direction of the light guide plate 2 in the region II, the two patterns can not be matched with each other in the vicinity of the junction of the regions I and II, so that a smooth variation of density of occupation of the light diffusing elements is not achieved. This mismatching might cause the luminance unevenness in the vicinity of the junction of the regions I and II.

Further, if the gradient in the region I is set so as not to cause inadequate luminance in the vicinity of the electrode portion 1a and the magnitude and gradient of the density of occupation of the light diffusing elements are set independently with its appropriateness taken precedence of the other things in the region II, portions indicated by Z might be reversely graded in density of occupation of the light diffusing elements.

Thus, in the conventional art, if the length of the emitting portion of the rod-shaped lamp disposed at the side of the light guide plate is smaller than the width of the light guide plate, it is difficult to define an appropriate distribution pattern of light diffusing elements on the rear surface of the light guide plate, which secures the uniform luminance in both depthwise and widthwise directions of the light guide plate and prevents local occurrence of sharp gradients and reverse gradients of the density of occupation of the light diffusing elements.

SUMMARY OF THE INVENTION

It is an object of the present invention to provide a technological measure of solving the foregoing problems in the conventional surface light source device of side light type, and more particularly to provide a surface light source device of side light type in which an appropriate distribution pattern of light diffusing elements is defined on the rear surface of a light guide plate so as not to cause the luminance unevenness over the entire luminous surface under the condition that the length of an emitting portion of a rod-shaped lamp as a primary light source is smaller than the width of the light guide plate.

The present invention provides a surface light source device of side light type having a light guide plate and a primary light source disposed at the side of the light guide plate to solve the above-mentioned technical problems on condition that the length of the emitting portion of the primary light source is smaller than the width of the light guide plate. According to the present invention, the following conditions are set to a pattern of the light diffusing elements arranged on the rear surface of the light guide plate.

(1) the pattern of the light diffusing elements excludes a portion in which the rate of area occupation of the light diffusing elements decreases from a region highly exposable to light from the primary light source to a region lowly exposable to light from the primary light source; and (2) a pattern of the light diffusing elements excludes a portion in which the rate of area occupation of the light diffusing elements varies sharply.

The pattern of the light diffusing elements can be defined according to the following stages:

[1] determining a distribution pattern of light diffusing element with a gradient of area occupation rate of the light diffusing element so that the distribution of luminance is uniformed in a depthwise direction of the light guide plate;

[2] measuring the luminance distribution in a widthwise direction of the light guide plate in the vicinity of the primary light source with the light diffusing element pattern defined in stage [1];

[3] determining a size of the light diffusing element A at the corner of the light guide plate in the vicinity of the non-emitting portion in consideration of the magnitude of the luminance drop at the corner measured in stage [2], and determining a border for dividing a portion in the vicinity of the primary light source on the rear surface of the light guide plate into a near block having no substantial drop of luminance of the light guide plate and a near block having a substantial drop of luminance of the light guide plate, based on the determined size of the light diffusing element A;

[4] selecting a light diffusing element A' having a size equal to or slightly larger than the size of the light diffusing element A in the distribution pattern defined in the step [1], and determining a line passing near the light diffusing element A' and extending widthwise of the light guide plate as a border between the far block remote from the primary light source and each of the near blocks;

[5] adopting the distribution pattern defined in the step [1] for the light diffusing elements in the block and in the near block having no substantial luminance drop; and

[6] determining the distribution pattern of the light diffusing element in a portion B ranging from the border of the near block having no substantial luminance drop to the portion of the light diffusing element A, in such manner that the rate of area occupation of the light diffusing element smoothly varies based on the result of the measuring in stage [2], and determining the distribution pattern of the light diffusing elements for a portion C ranging from the portion B to the border of the far block, and for a portion D ranging from the portion of the light diffusing element A to the border of the far block, in such a manner that the rate of area occupation of the light diffusing element smoothly varies.

It is preferable that the size of the light diffusing element A is determined so that the distribution pattern of the light diffusing element for the portion B causes no unevenness of luminance in the portion B. At a corner portion of the light guide plate in the vicinity of the non-emitting portion of the primary light source there is provided an additional pattern of the light diffusing element for compensating a luminance drop to be caused due to the vicinity of said non-emitting portion of said primary light source. It is preferable that the size and/or shape of said pattern of said light diffusing element is determined after stage [6].

According to the present invention, the technological measures for resolving the above-mentioned problems of the conventional side-light-type surface light source device. Namely, an appropriate distribution pattern of the light diffusing elements is defined on the rear surface of the light guide plate so that any luminance unevenness is not caused over the entire luminous surface under the condition that the length of the emitting portion of the rod-shaped lamp as a primary light source is smaller than the width of the light guide plate.

For the above purpose, the pattern of the light diffusing elements is designed to exclude a portion in which the rate of area occupation of the light diffusing elements decreases from a region highly exposable to light from the primary light source to a region lowly exposable to light from the primary light source. At the same time, the condition is satisfied that the pattern of the light diffusing elements excludes a portion in which the rate of area occupation of the light diffusing elements varies sharply. The procedure of designing the pattern of light diffusing elements for satisfying these conditions will be disclosed in the specification.

The present invention will be described in greater detail with reference to the accompanying drawings.

DESCRIPTION OF THE PREFERRED EMBODIMENTS

Figure 1:
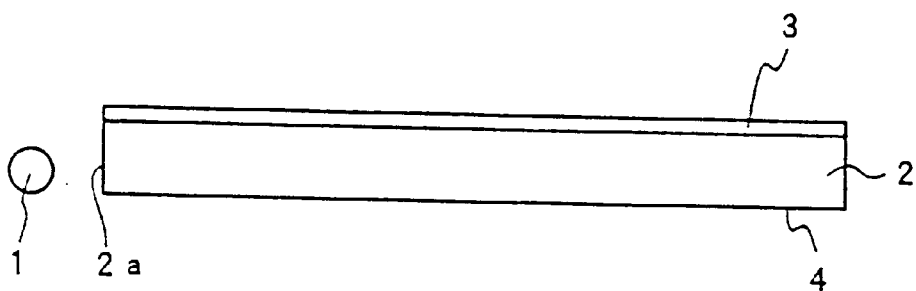
FIG. 1 is a fragmentary cross-sectional view showing a conventional surface light source device of side light type.

The framework of a side-light-type surface light source device of the present invention is basically the same as that of FIG. 1. However, a lamp 1 having an emitting portion of a length smaller than a width of a light guide plate 2 is used so as to prevent the electrode portions from projecting from a depthwise side of the light guide plate and thereby not deteriorating the compactness of the whole device. Further, in general, the shorter the lamp 1 is, the smaller the electricity consumption would become and therefore the above arrangement results in view of saving power.

The present invention is directed to how to define a distribution pattern (hereinafter simply referred to as "a dot pattern") of the light diffusing elements arranged on the rear surface of the light guide plate. First, the procedure of defining the dot pattern according to the concept of the present invention will be described. For convenience of the description, the procedure of defining a dot pattern is divided into seven stages and will be described referring to FIGS. 5–13, which corresponds to the individual stages except the sixth stage which includes steps. Illustration in each figure is limited to minimal essentials.

Further, a unit element of the dot pattern is represented by a rectangular mark rather than a circular mark. In general, as long is a gradient of light-diffusing ability per unit area is realized as designed, there is no limitation in shape of the unit element of the dot pattern. Here, the gradient of light-diffusing ability per unit area is given in terms of the rate of area occupation of the dot pattern. Namely, in the absence of any proviso, it is assumed that the light-diffusing ability per unit area of each dot pattern element is uniform.

Figure 5:
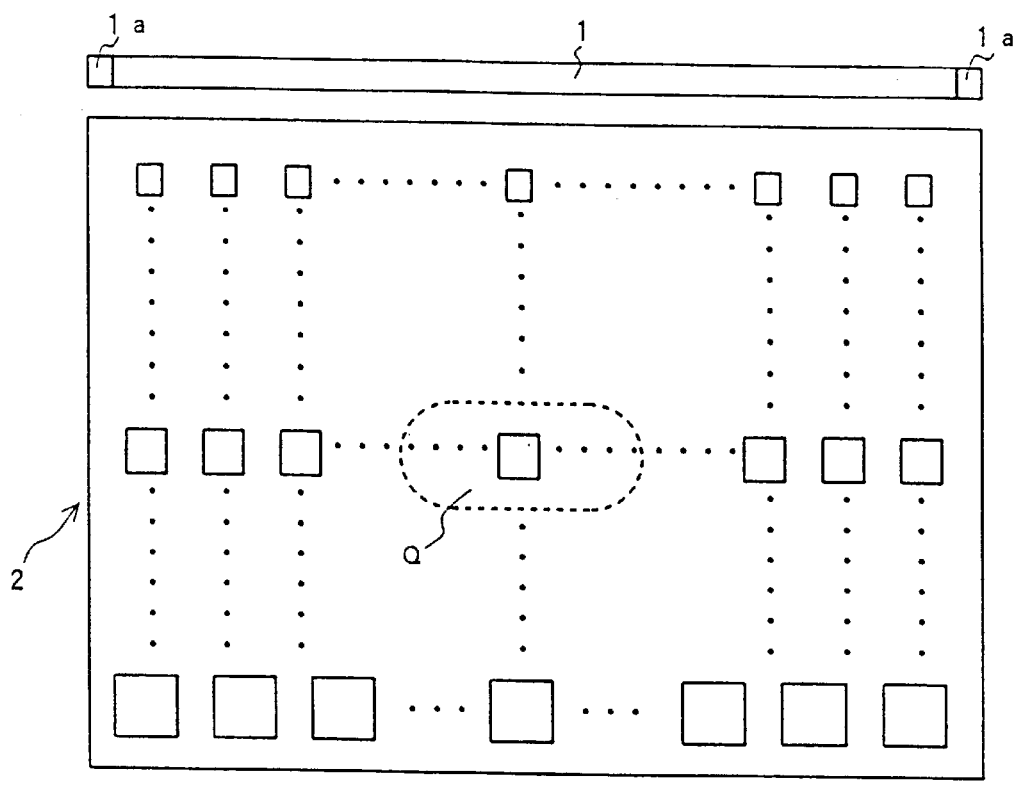
FIG. 5 is a schematic view showing a first stage of the procedure of defining a dot pattern according to the concept of the present invention.

[First Stage]; with reference to FIG. 5

Figure 2:
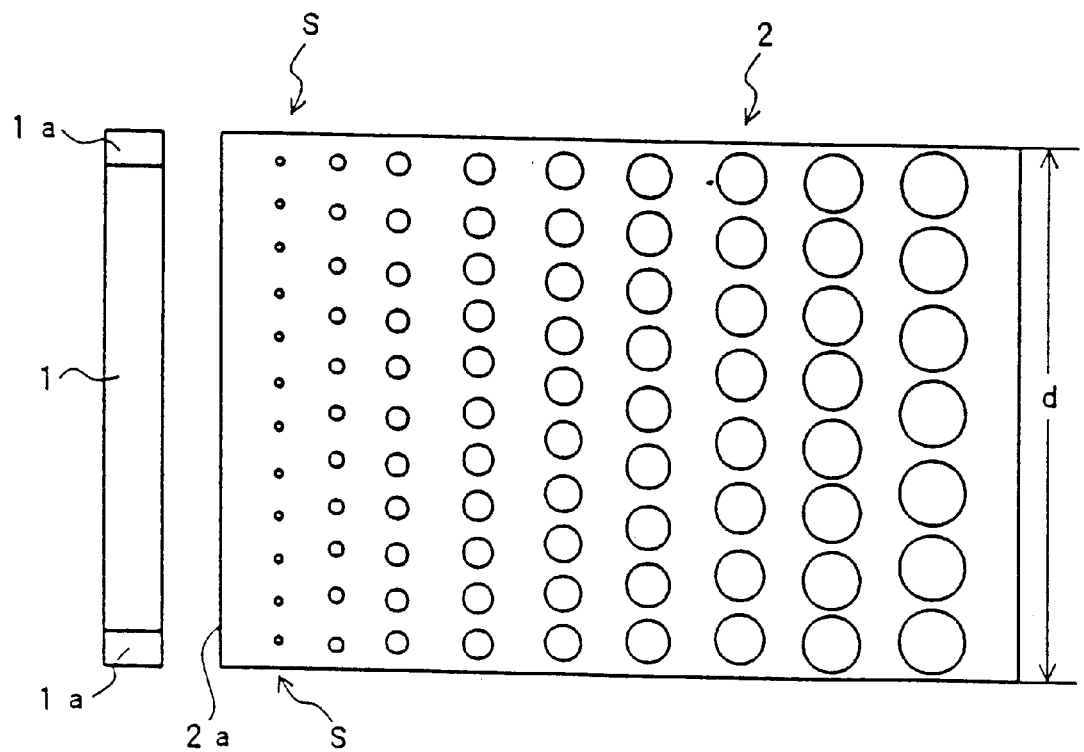
FIG. 2 is a plan view of a light guide plate, as seen from the rear side thereof, on which light diffusing elements are arranged in the most basic distribution pattern according to the conventional art.
Figure 3:
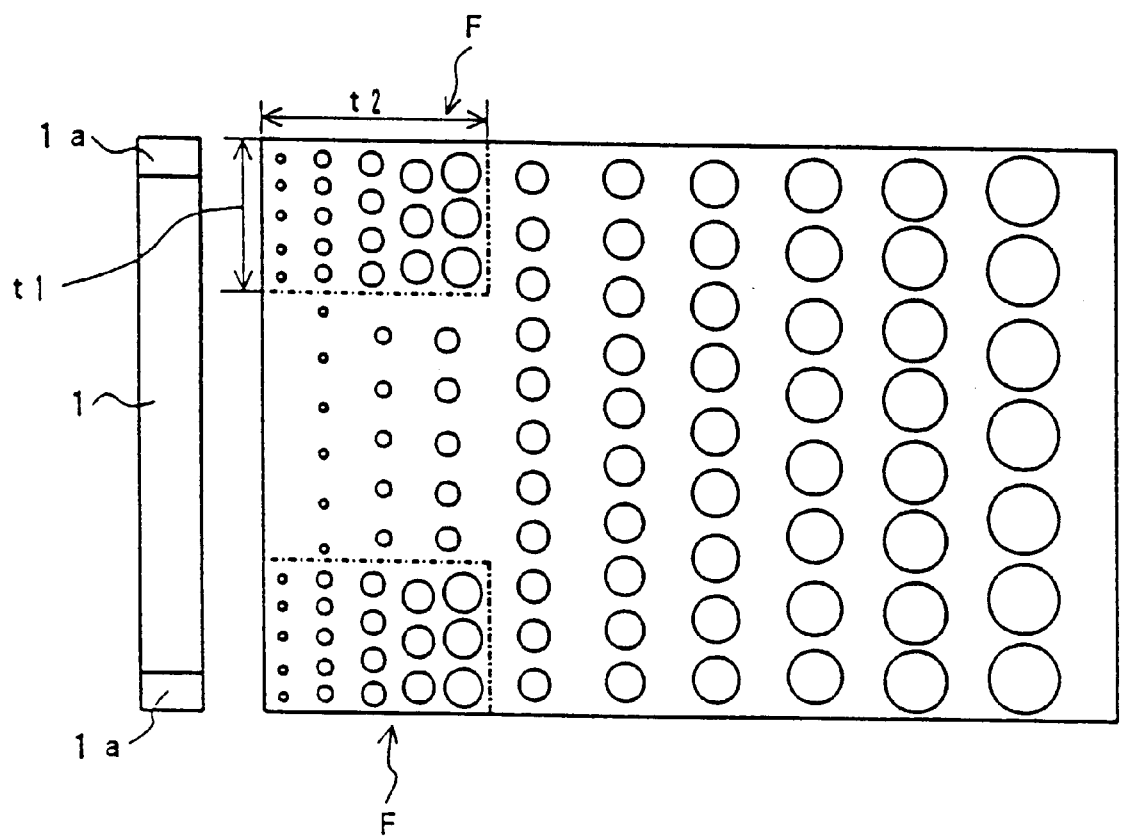
FIG. 3 is a plan view of a light guide plate showing one example of the distribution pattern for the uniform luminance according to the conventional art.
Figure 4:
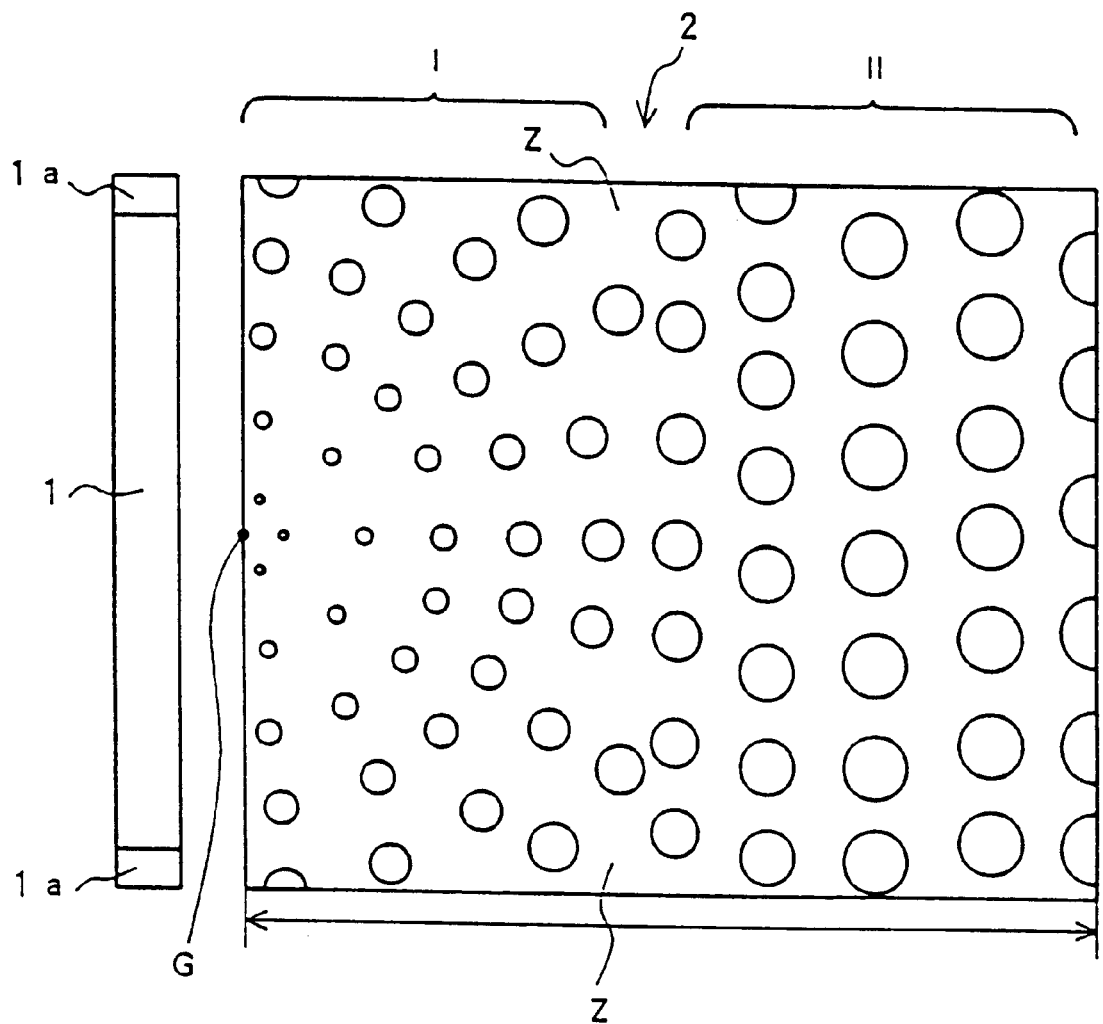
FIG. 4 is a plan view of a light guide plate showing another example of the distribution pattern for the uniform luminance according to the conventional art.

First, a dot pattern is defined for the entire rear surface of the light guide plate 2 by determining a gradient in the direction of depth of the light guide plate 2. A gradient of the rate of area occupation is determined depthwise in view of the luminance at the center (indicated by Q) of the light guide plate 2. Namely, the dot-pattern defining concept of FIG. 2 is adopted. The defined dot pattern will become larger according to the distance from the lamp 1. As a matter of course, at this stage, a luminance drop in the vicinity of the both ends 1a of the lamp 1 is not considered.

Figure 6:
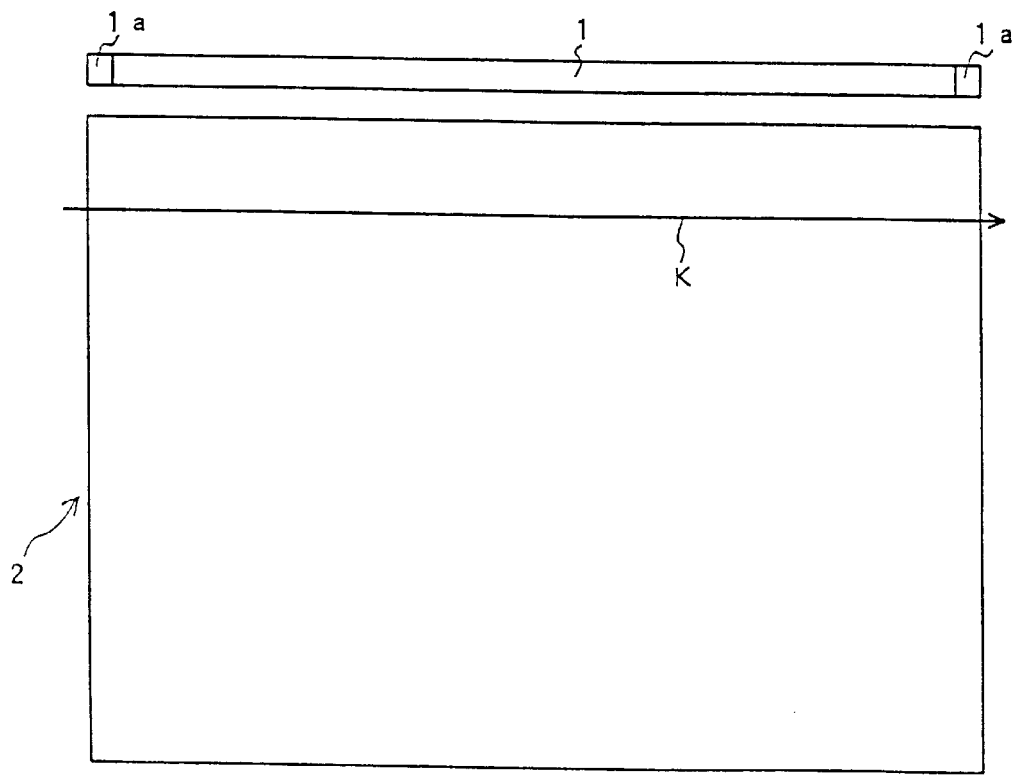
FIG. 6 is a schematic view showing a second stage of the procedure of defining a dot pattern according to the concept of the invention.

[Second Stage]; with reference to FIG. 6

In the dot pattern defined in the first stage, the luminance distribution in the direction of width of the light guide plate 2 (indicated by an arrow K) is measured in the vicinity of the lamp 1.

Figure 7:
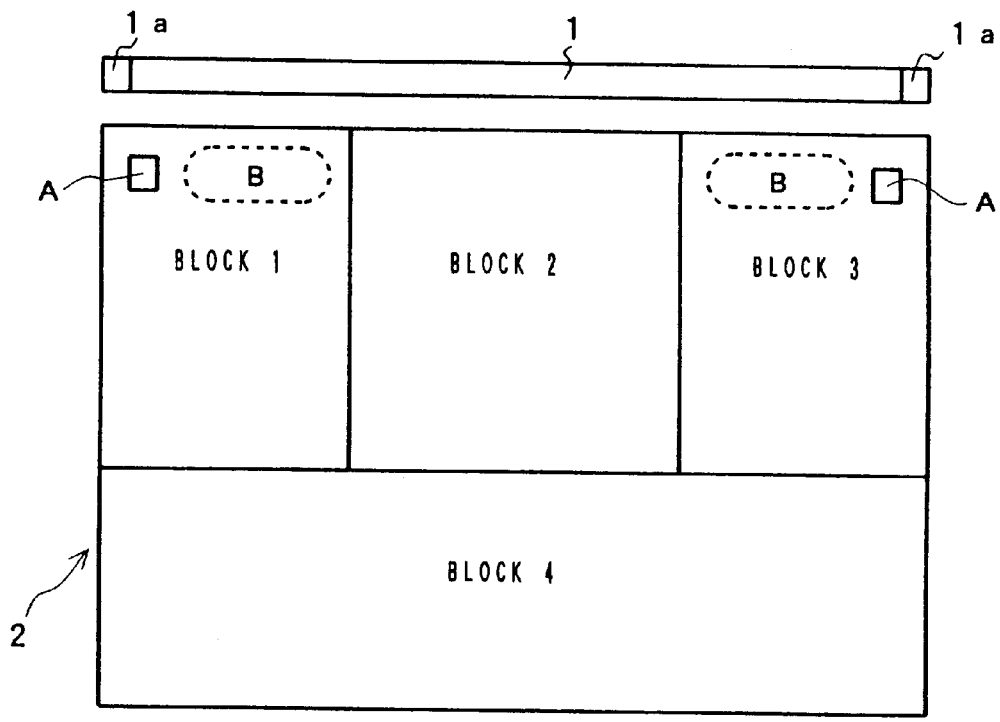
FIG. 7 is a schematic view showing a third stage of the procedure of defining a dot pattern according to the concept of the invention.

[Third Stage]; with reference to FIG. 7

Considering the magnitude of the luminance drop in the vicinity of the lamp ends 1a as measured at Stage 2, the size of the dots A at those portions is determined.

Then, the entire rear surface of the light guide plate 2 is divided into near blocks and a far blocks (blocks near the lamp 1 and block far from the lamp 1) according to the distance from the lamp 1. Here, since the lamp 1 has non-emitting portions at both ends, the near blocks are defined as blocks 1–3 while the far block is defined as a block 4, as shown in FIG. 7. At this stage, a border of the blocks 1 and 2 and a border of the blocks 2 and 3 are determined in the following manner.

Lines of opposite ends (extending in the depthwise direction) of a widthwise range in which a luminance drop of the light guide plate 2 is discriminated to be substantially zero according to the measurement at the second stage are regarded as a border of the blocks 1 and 2 and a border of the blocks 2 and 3.

If the luminance in the vicinity of the lamp ends 1a is extremely low as compared to the luminance level of block 2, the size of the dot A is determined by considering a measured value of luminance of the portion near the border of the block 2, neglecting a measured value of luminance in the vicinity of the lamp ends 1a. It is preferable to decide whether or not the above procedure should be taken in consideration of the distance between the borders of the block 2 and the widthwise ends.

Namely, if the luminance drop in the vicinity of the lamp ends 1a is large and the above distance is short, the foregoing procedure is taken. On the contrary, if the luminance drop in the vicinity the lamp ends 1a is small and the above distance is long, the foregoing procedure is not needed. In an intermediate case, the discrimination is made in consideration of the luminance drop and the distance.

If the luminance drop is even, necessity of the foregoing procedure increases as the distance is shorter. The purpose of the procedure is to prevent the rate of variation of the dot size in the portion B which is referred to at the later stage 6 from being made excessive to occur the luminance unevenness in that portion. In other words, it is preferable to adopt the substantially maximal dot size for the dot A in a range where no luminance unevenness occurs in the portion B.

Figure 8:
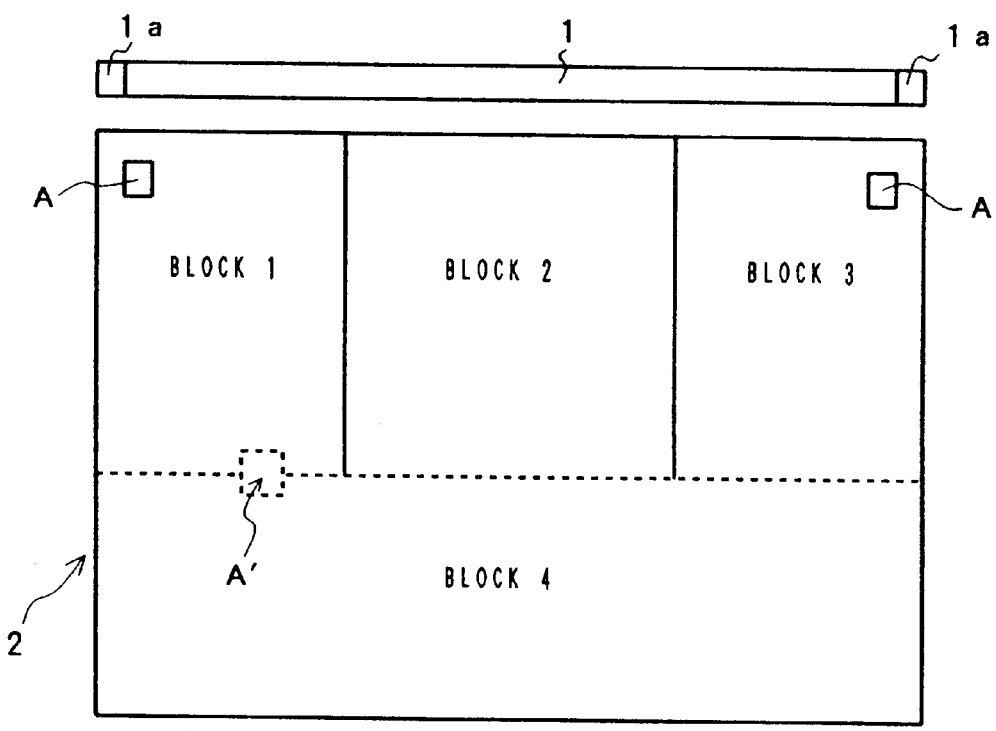
FIG. 8 is a schematic view showing a fourth stage of the procedure of defining a dot pattern according to the concept of the invention.

[Fourth Stage]; with reference to FIGS. 7 and 8

A border of the block 4 and the blocks 1–3 shown in FIG. 7 is determined as follows: Considering the depthwise gradient of the area occupation rate determined at stage 1 and the result of measurement at stage 2, a dot A' equal to or slightly larger than the dot A is selected, and a line passing (widthwise of the light guide plate 2) near the dot A' is defined to be the border of the block 4 and the blocks 1–3. At that time, attention should be paid not to select a dot smaller than the dot A. If a dot smaller than the dot A is selected as the dot A', a reverse gradient (a gradient that the size of dots far from the lamp 1 is smaller than that of the dots near the lamp 1) would have occurred in the vicinity of the border of the block 4 and the blocks 1–3.

Figure 9:
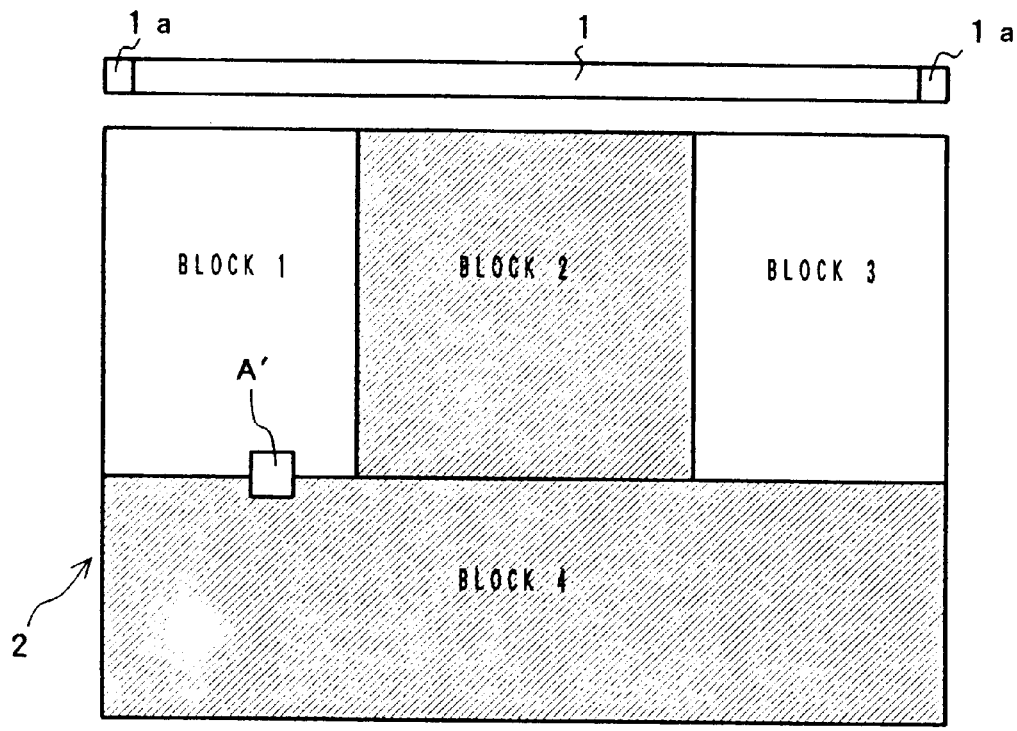
FIG. 9 is a schematic view showing a fifth stage of the procedure of defining a dot pattern according to the concept of the invention.

[Fifth Stage]; with reference to FIG. 9

Dots within the blocks 2 and 4 (indicated by diagonal lines) are determined in conformity with those in the dot pattern defined at the stage 1.

Figure 10:
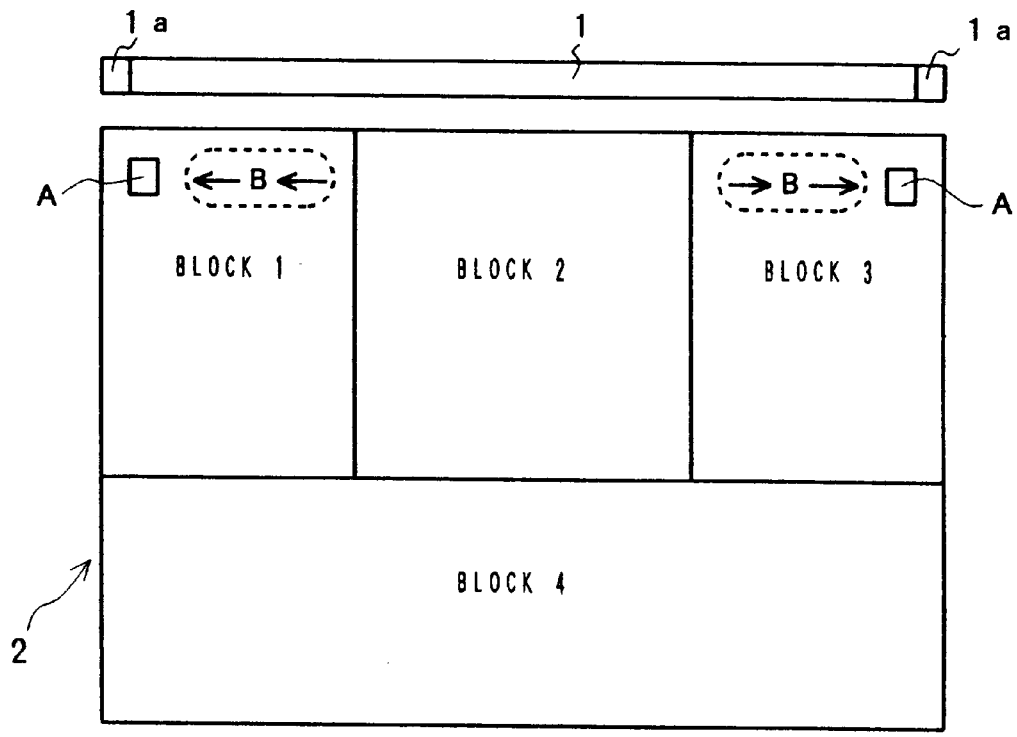
FIG. 10 is a schematic view showing a first step of a sixth stage of the procedure of defining a dot pattern according to the concept of the invention.
Figure 11:
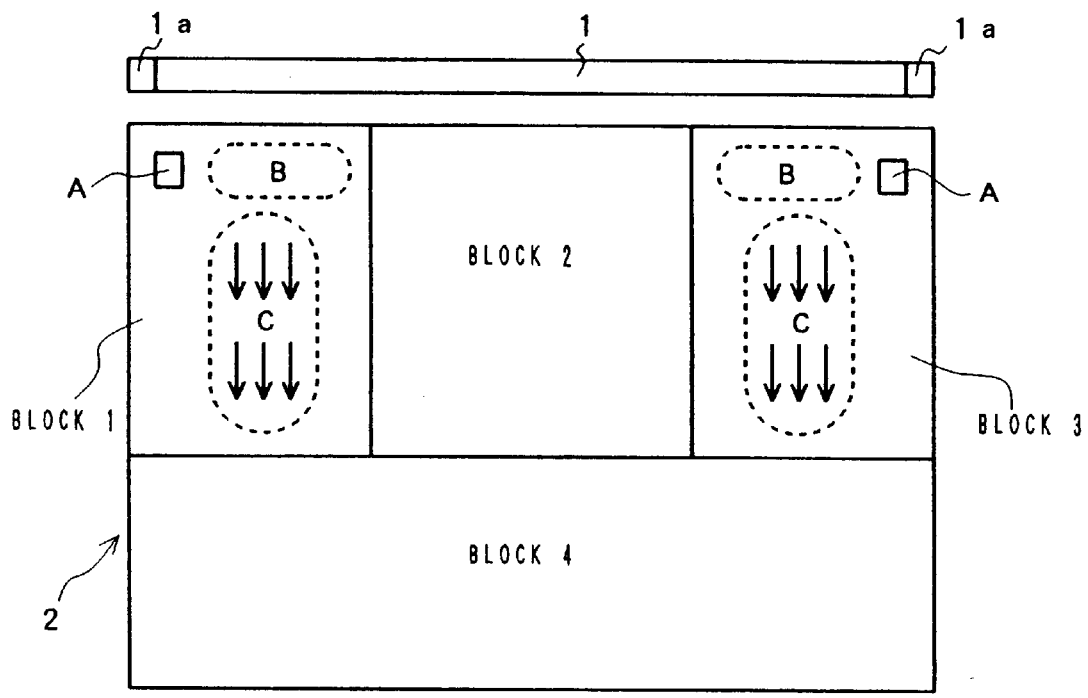
FIG. 11 is a schematic view showing a second step of the sixth stage of the procedure of defining a dot pattern according to the concept of the invention.
Figure 12:
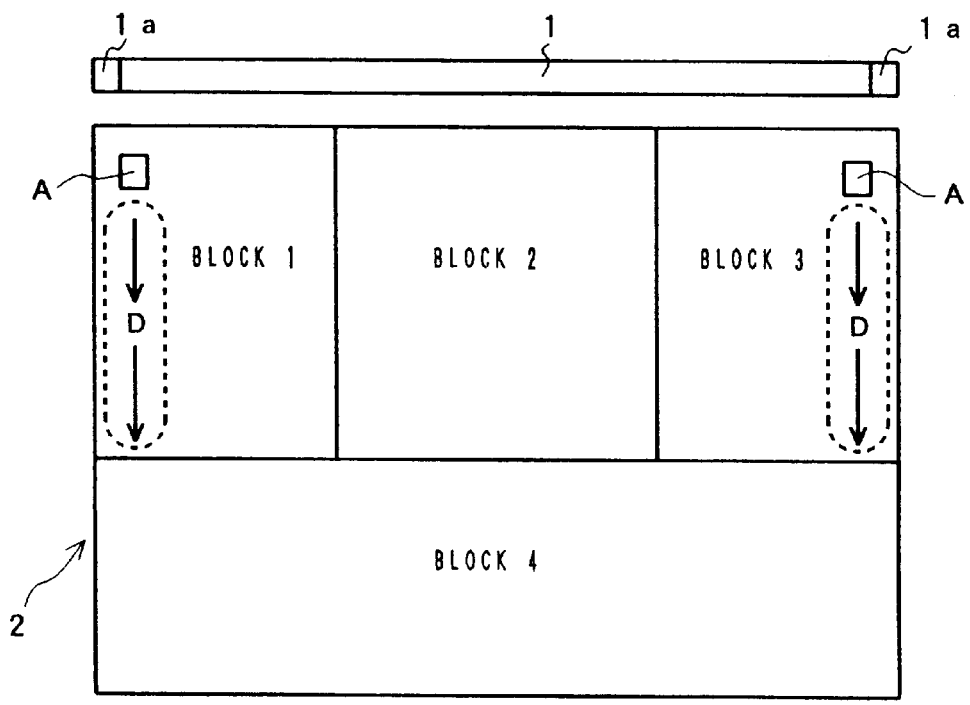
FIG. 12 is a schematic view showing a third step of the sixth stage of the procedure of defining a dot pattern according to the concept of the invention.

[Sixth Stage]; with reference to FIGS. 10–12

In step 1 (FIG. 10), based on the result of measurement at stage 2, a dot pattern for the portion B (also indicated in FIG. 7), ranging from the border of the block 2 toward the dot A is defined. Since the size of the dots at the border of the block 2 and the size of the dot A are already determined, the gradient of the rate of area occupation is determined so as to link these portions smoothly. This gradient is not necessarily linear but may be in a desired form in consideration of the measurement result at stage 2.

So as to confirm that no luminance unevenness would occur in the portion B, a luminance distribution of this portion is measured again with the defined dot pattern. If the luminance unevenness (usually, a stria light-and-shade pattern) is observed, it means that the dot A is too large, as mentioned at stage 3. Thus, in such case, after appropriately reducing the size of the dot A, the dot pattern for the portion B is defined again and confirm that the luminance unevenness is eliminated.

In step 2 (FIG. 11), a dot pattern for a portion C ranging from the portion B toward the border of the block 4 is defined. Since the size of dots in the portion B and the size of dots at the border of the block 4 are already determined, the gradient of the rate of area occupation is determined so as to link these two portions smoothly.

In step 3 (FIG. 12), a dot pattern for a portion D ranging from the portion A toward the border of the block 4 is defined. Since the size of dots in the portion B and the size of dots at the border of the block 4 are already determined, the gradient of the rate of area occupation is determined so as to link these two portions smoothly. According to the way of determining the border of the block 4 at stage 4, this gradient would generally be small. If the size of the dot A' selected at stage 4 is equal to the size of the dot A, the gradient is made 0.

Figure 13:
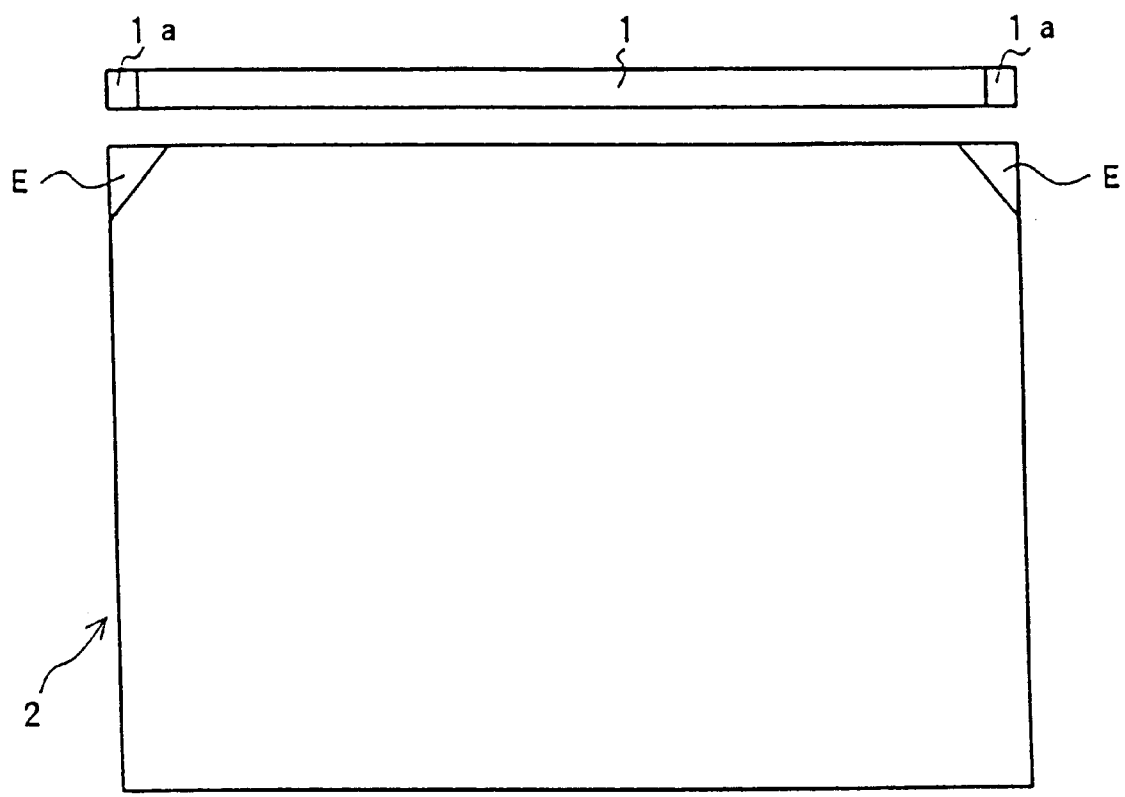
FIG. 13 is a schematic view showing a seventh stage of the procedure of defining a dot pattern according to the concept of the invention.

[Seventh Stage]; with reference to FIG. 13

This stage is an additional stage to be added when the size of the dot A is determined not based on the luminance value (executed in Stage 2) at the position of the dot A (in the vicinity of the lamp ends 1a) but in consideration of a measured value of luminance in the vicinity of the border of the block 2. In other words, when the size of the dot A is determined based on the luminance value at the position of the dot A (in the vicinity of the lamp ends 1a), this stage is unnecessary in general.

At this stage, the portion of the dot A (in the vicinity of the lamp ends 1a) is regarded as a special region E. In the region E, a light diffusing element (a large-area dot or a dot group) extending from an apex of the corner toward a central portion of the light guide plate 2 is provided in the form of triangle, fan-shape or a V-shape. The size and shape of the region E are adjusted to compensate for a remarkable luminance drop in the vicinity of the lamp ends 1a.

Strictly speaking, the dots provided on the rear surface of the light guide plate 2 do not independently affect the luminance of that portion but are influenced by the dots in other portions. Especially, when the region E is set at the corner, a considerable influence is given on its circumferential portion. Accordingly, in designing the region E, it is preferable to adjust the size and shape (also, diffusing ability per unit area, if necessary), taking the above influence into consideration.

Figure 14:
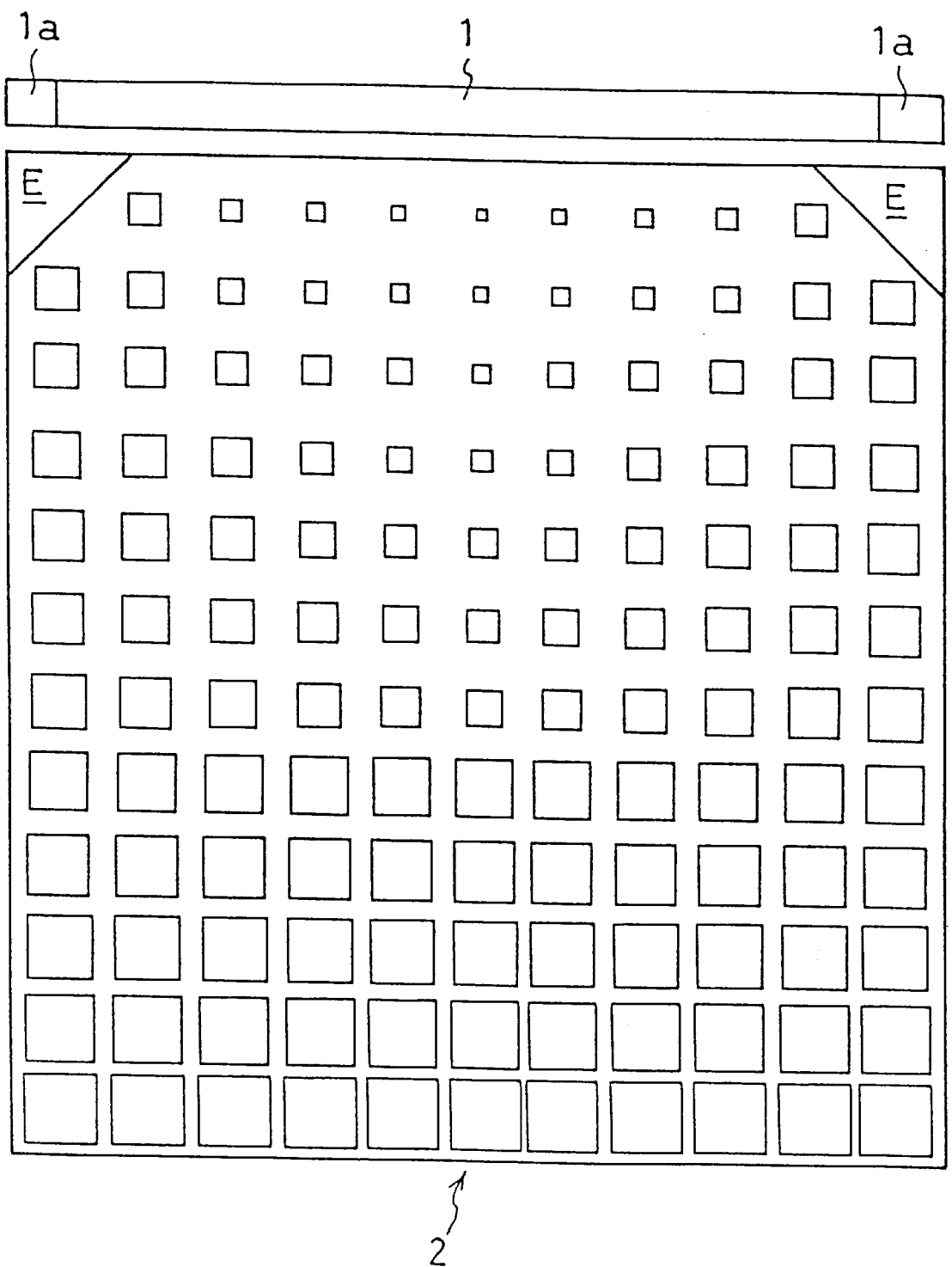
FIG. 14 is a schematic view showing an example of the dot pattern completed through the stages 1–7.

FIG. 14 shows an example of dot pattern completed through the above-described stages 1–7. As is apparent from FIG. 14, the following principles are satisfied on the entire rear surface of the light guide plate 2.

(1) There is not any (reverse gradient) portion where the rate of area occupation of the dot pattern decreases from a region highly exposable to light from the lamp 1 (usually nearer to the lamp 1) to a region lowly exposable to light from the lamp 1 (usually far from the lamp 1).

(2) There is not any portion where the rate of area occupation of the dot pattern varies sharply.

The above features have not been realized in the conventional art, as mentioned previously. In a special case (e.g., when the depth of the light guide plate 2 is very small as compared to the width thereof), the dot A' might not be found at stage 4. In such case, the end of the plate opposite to the lamp 1 is regarded as the border of the block 4 and the blocks 1–3. Here, the block 4 does not actually exist but imaginarily exist. Therefore, the present invention includes such case.

As is understood from the foregoing description, according to the present invention there is provided a side-light-type surface light source device with no luminance unevenness over its entire luminous surface on condition that the length of an emitting portion of a rod-shaped lamp used as a primary light source is smaller than the width of a light guide plate, thus realizing both compactness of the side-light-type surface light source device and luminance unevenness.

What is claimed is:

1. A surface light source device of side light type having a light guide plate and a rod-shaped primary light source arranged at a side of said light guide plate, wherein a length of an emitting portion of said primary light source is smaller than a width of said light guide plate, a pattern of a light diffusing element is provided on a rear surface of said light guide plate, the pattern of said light diffusing element is defined under the conditions that said light guide plate excludes a portion where a rate of area occupation of said light diffusing element decreases from a region highly exposable to light from said primary light source of a region hardly exposable to light from said primary light source, and also excludes a portion where the rate of area occupation of said light diffusing element varies sharply, said pattern of light diffusing element being defined according to the steps of:
(1) determining a distribution pattern of light diffusing element with a gradient of area occupation rate of said light diffusing element so that the distribution of luminance is uniform in a depthwise direction of said light guide plate;
(2) measuring the luminance distribution in a widthwise direction of said light guide plate in the vicinity of said primary light source with said light diffusing element pattern defined in said step (1);
(3) determining a size of a first light diffusing element at the corner of said light guide plate proximate said non-emitting portion in consideration of the magnitude of said luminance drop at said corner measured in said step (2), and
determining a border for dividing a portion of said first light diffusing element proximate said primary light source on a rear surface of said light guide plate into a near block having no substantial drop of luminance of said light guide plate and a near block having a substantial drop of luminance of said light guide plate, based on said determined size of said first light diffusing element;
(4) selecting a second light diffusing element having a size equal to or slightly larger than the size of said first light diffusing element in said distribution pattern defined in said step (1), and determining a line passing near said second light diffusing element and extending widthwise of said light guide plate as a border between said far block remote from said primary light source and each of said near blocks;
(5) adopting said distribution pattern defined in said step (1) for said light diffusing elements in said block and in said near block having no substantial luminance drop; and
(6) determining the distribution pattern of said first light diffusing element in a portion of said light diffusing element ranging from the border of said near blocks having no substantial luminance drop to the portion of said first light diffusing element, in such manner that the rate of area occupation of said light diffusing element smoothly varies based on the result of said measuring in said step (2), and
determining the distribution pattern of said first light diffusing elements for a second portion of said light diffusing element ranging from said first portion to the border of said far block, and for a third portion D of said light diffusing element ranging from the portion of said first light diffusing element to the border of said far block, in such a manner that the rate of area occupation of said light diffusing element smoothly varies.

2. A surface light source device of side light type according to claim 1 wherein the size of said light diffusing element A is determined so that the distribution pattern of said light diffusing element for said portion B causes no unevenness of luminance in said portion B.

3. A surface light source device of side light type according to claim 1, wherein said pattern of said light diffusing element at a corner portion of said light guide plate proximate the non-emitting portion of said primary light source includes a pattern for compensating a luminance drop to be caused due to proximity of said non-emitting portion of said primary light source, and the size and shape of said pattern of said light diffusing element are determined after said step (6).

* * * * *

UNITED STATES PATENT AND TRADEMARK OFFICE
CERTIFICATE OF CORRECTION

PATENT NO. : 5,921,651
DATED : July 13, 1999
INVENTOR(S) : Tsuyoshi ISHIKAWA

It is certified that error appears in the above-identified patent and that said Letters Patent is hereby corrected as shown below:

On title page item [54] and col. 1, lines 1-4,
    IN THE TITLE:
    Please change "SURFACE LIGHT SOURCE DEVICE OF SIDE LIGHT TYPE HAVING DIFFUSING ELEMENT WITH IMPROVED DISTRIBUTION PATTERN OF LIGHT" to --SURFACE LIGHT SOURCE DEVICE OF SIDE LIGHT TYPE FOR IMPROVING A DISTRIBUTION PATTERN OF A DIFFUSED ELEMENT--.

Col. 2, line 60, change "rodite" to --radiate--.

Col. 6, line 13, after "stage" insert --,--; after "includes" insert --three--.

Col. 6, line 45, delete "a".

Signed and Sealed this

Twenty-second Day of February, 2000

Attest:

Q. TODD DICKINSON

Attesting Officer      Commissioner of Patents and Trademarks